3,677,967
DOSE INDICATOR PAINT OF AN AQUEOUS EMULSION OF VINYL CHLORIDE COPOLYMER AND METHANYL YELLOW
Janos Dobo, Agnes Somogyi, and Endre Lakner, Budapest, Hungary, assignors to Medimpex Gyogyszerkulkereskedelmi Vallalat
No Drawing. Filed Jan. 15, 1969, Ser. No. 791,488
Claims priority, application Hungary, Jan. 18, 1968, MU-398
Int. Cl. G01n 23/06, 31/22
U.S. Cl. 252—408
3 Claims

ABSTRACT OF THE DISCLOSURE

A dose indicator paint for controlling the irradiation of polyethylene and other non-hydrophilic target materials, comprising an aqueous emulsion of a vinyl chloride copolymer, 0.5 to 10% by weight of methanyl yellow and, if desired, additives.

---

This invention relates to a dose indicator paint for controlling the irradiation of polyethylene and other non-hydrophilic target materials, undergoing a well discernible colour on irradiation. Furthermore the invention relates to a method for producing this paint.

With the development of the radiation process industry and with the expansion of the plants using cobalt-60 or electron accelerator facilities, the science of measuring radiation doses, that is the dosimetry, has to solve more and more diversified tasks. An especially rapid development can be observed with the dose indicators, giving a quick semi-quantitative information on the dose received by the target material. Such a dose indicator is the radiation label according to U.S. Pat. No. 3,290,499, Dec. 6, 1966. This indicator is produced by depositing a film from an aqueous emulsion of a halogen-containing polymer composition having incorporated an acid-sensitive dye onto adhesive labels, then drying the said film, providing it with a protective coating and repeating the drying process.

Dose indicators of the above-mentioned type are useful e.g. for marking paper-wrapped parcels to be irradiated, but they cannot be used for the marking of glass tubes and other laboratory wares. Self-adhesive labels are especially unfit for controlling the irradiation of polymer foils or tubes, e.g. in the industry of the polyethylene and polyolefine crosslinking industry, where as a rule coils of films or bundles of tubes are to be irradiated in a continuous process. The adhesive labels fall off from the glass, polyethylene or polyolefine surfaces and are particularly unsuited for the continuous marking of tubes and coils of films.

U.S. Pat. No. 2,830,943 relates to the control of the irradiation of polyethylene, wherein, the dye Sudan III is incorporated into the mass of the polyethylene to be subjected to the irradiation. The irradiation itself and the approximate dose can be checked by the discolouration of the dye. This method is used by the industry, but it has some disadvantages as well. Thus e.g., it serves especially for the control of the irradiation of polyethylene and is not suitable for controlling the irradiation of other materials, e.g. PVC, glass, porcelain, etc. A further disadvantage is that the dye has to be incorporated into the basic mass of the polyethylene during the manufacture of the polyethylene items. Consequently, in this way, only products prepared especially for this purpose can be used for irradiation. Another disadvantage is that the dye should be incorporated into the whole mass of the polyethylene item or at least into a great part of it, leading to unnecessarily high dye-consumption and in some cases even to a lowering of the performance of the polyethylene, if some delicate uses of the irradiated material are considered. In the case of food-packaging and other applications, the unchanged or decomposed dyestuff remaining in the polyethylene is disadvantageous too. A further disadvantage is that the deepness of the colour and thus the dose indication depends on the thickness of the item.

The object of the invention is a dose indicator paint changing colour on irradiation which avoids the above-mentioned disadvantages and can be coated onto plastic, glass and other non-hydrophilic surfaces before irradiation.

This task cannot be accomplished by radiation-sensitive colours which are dissolved in organic solvents, among others because some constituents of the solution can diffuse into the plastics and can make the indication uncertain. Therefore, only solutions based on emulsions in water can be taken into consideration.

The known emulsions cannot be used for the given application. Thus e.g. the emulsion of the above mentioned Pat. No. 3,290,499, when coated onto polyethylene and to other, non-hydrophilic surfaces, does not give any stable colouration. The red colour, marking the irradiation state of a film deposited onto polyethylene from an emulsion containing dimethyl yellow or diethyl yellow, dried and irradiated, looses colour even after standing for some minutes, while it completely disappears after further standing. The colour of an indicator containing thymol blue is even less stable.

Now it has unexpectedly been found that a paint suitable for marking of polyethylene, polyolefines, PVC, glass and of other non-hydrophilic surfaces can be produced by giving a certain amount of methanyl yellow (4'-aniline-azobenzene-m-sulfonic acid) to aqueous emulsions of PVC or vinyl chloride copolymers.

Methanyl yellow is a water soluble dye; its ability for marking non-hydrophilic surfaces is therefore surprising and unexpected. Namely, if a mixture of methanyl yellow and an aqueous emulsion of vinyl chloride copolymers is deposited onto hydrophilic surfaces, such as paper and similar, well wettable surfaces, coatings of an uncertain colour and unfit for dose indication purposes are obtained. No useful dose indication can be obtained by mixing the methanyl yellow into the solutions of vinyl chloride copolymers in organic solvents and depositing these solutions onto polyethylene or onto other, non-hydrophilic surfaces either. The peculiar behaviour of methanyl yellow in aqueous emulsions of vinyl chloride copolymers is especially surprising if compared with other dyes of very similar structure and of very similar acid-base indicator character. Thus if Tropeoline 00 (4'-aniline-azobenzene-p-sulphonic acid), which has nearly the same structure and acid-base transition point as methanyl yellow, and the colour of which is also nearly the same in aqueous acid and alkaline solutions, is mixed into vinyl chloride copolymer emulsions, the thus-produced emulsion gives after irradiation on non-hydrophilic surfaces only an uncharacteristic and poorly reproducible colour indication.

This peculiar behaviour of methanyl yellow is believed to be unexpected in connection with the fact that methanyl yellow is applicable as an adsorption indicator with inorganic halogen-containing precipitates. Some other dyes, such as bromphenol blue and bromcresol green, similarly used as adsorption indicators show a somewhat analogous behaviour with that of methanyl yellow. But these dyes, when mixed into aqueous emulsions of vinyl chloride copolymers and deposited onto non-hydrophilic surfaces, give a striped, spotted discolouration after irradiation.

The invention relates to a dose indicator point for controlling the irradiation of polyethylene and other, non-hydrophilic materials, comprising an aqueous emulsion of a vinyl chloride copolymer, 0.5 to 10% by weight of methanyl yellow and, if desired, additives.

Furthermore the invention relates to a method for the production of the said paint, in which 0.5 to 10% by weight of methanyl yellow and, if desired, additives are added to an aqueous emulsion of a vinyl chloride copolymer.

The dose indicator paint according to the invention has several advantages. It can be deposited onto any parts of the target item. It adheres well to polyethylene, polyolefine, glass, porcelain and other non-hydrophilic surfaces. It dries quickly and gives a colour indication well recognizable even by unskilled personnel. Its use is not limited to a given polymer such as polyethylene. The indication does not depend on the nature of the non-hydrophilic target material.

The paint according to the present invention can be stored well. The colour of the marked surface is stable both before and after the irradiation and does not need any after-treatment. If necessary, the film formed by the paint can be removed with the aid of a knife from the marked surface, both in irradiated and non-irradiated states.

The dose indicator paint according to the invention is apt for controlling the dose distribution on large surfaces and for continuously marking endless target items (foils). Furthermore it can be used to the automatic monitoring of the effected irradiation and the received dose, e.g. by running the strip of the target film, marked by the indicator, between the head and the light source of a photometer equipped with an appropriate filter. The strong colour change makes the process especially suitable for automation.

The dose indicator paint, according to the invention and its preparation is further illustrated by the aid of the following examples.

EXAMPLE 1

100 ml. of an aqueous emulsion of a vinyl chloride-vinyl acetate copolymer, 2.0 g. of methanyl yellow, and 2.0 g. of gycerol are mixed. The mixture is left standing for 24 hours and stored in dark between 10–40° C.

The dose indicator paint thus prepared can be deposited onto the non-hydrophilic surface to be marked with the aid of a brush, a plastic sponge or a roller. After drying, the colour of the paint is changed by a dose of 3 Mrad from yellow to yellowish-brown, by 6 Mrad to brown, by 9 Mrad to violet-brown and by 12 Mrad to dark violet. The colour change can be determined by the naked eye or by a photometer.

EXAMPLE 2

10 ml. of an aqueous dispersion of a vinyl chloride vinylidene chloride acrylate copolymer, 0.3 g. of methanyl yellow, 0.5 g. of vinyl chloride vinyl acetate pearl polymer and 10 ml. chlorobenzene are mixed. The mixture is left to stand for 8 hours.

The thick, yellow paste thus produced can be deposited onto non-hydrophilic films by printing. The colour changes by a dose of 2.5 Mrad to violet.

What we claim is:

1. A dose indicator paint for controlling the irradiation of polyethylene and other non-hydrophilic target materials, comprising an aqueous emulsion of a vinyl chloride copolymer, and 0.5 to 10% by weight of methanyl yellow.

2. A method of producing a dose indicator paint according to claim 1 in which 0.5 to 10% by weight of methanyl yellow is added to an aqueous emulsion of a vinyl chloride copolymer.

3. A method for the continuous monitoring of the irradiation of polyethylene and other non-hydrophilic target materials, in which the colour change of the dose indicator paint as in claim 1 is followed by a photometer, the output of the photometer being used for registering the dose absorbed and/or for automatic equipment control.

References Cited

UNITED STATES PATENTS

| | | | |
|---|---|---|---|
| 2,830,943 | 4/1958 | Mackenzie | 204—159.18 |
| 3,290,499 | 12/1966 | Vale | 252—408 X |

JOHN T. GOOLKASIAN, Primary Examiner

M. E. McCAMISH, Assistant Examiner

U.S. Cl. X.R.

23—230 R; 204—159.18; 250—43.5